United States Patent [19]
Isaacs

[11] Patent Number: 5,377,879
[45] Date of Patent: Jan. 3, 1995

[54] MEASURING SPOON

[76] Inventor: Linda R. F. Isaacs, 517 Cedar Hill Rd., Far Rockaway, N.Y. 11691

[21] Appl. No.: 172,572

[22] Filed: Dec. 22, 1993

[51] Int. Cl.⁶ .......................... B67D 5/06; B67D 1/07
[52] U.S. Cl. .................................. 222/205; 73/427; 73/429; 604/68; 604/121; 604/77; 604/218; D10/46.2; D7/691; D24/116; 222/192
[58] Field of Search ............... 73/429, 427; D10/46.2, D10/46.3; D7/691; 30/324; D24/116; 604/68, 121, 77, 218; 222/192, 205

[56] References Cited

U.S. PATENT DOCUMENTS

| | | | |
|---|---|---|---|
| 2,603,093 | 7/1952 | Cordova | 73/427 |
| 2,698,996 | 1/1955 | Hickerson | 222/192 |
| 2,795,043 | 6/1957 | Fleischer | 73/427 |
| 2,953,170 | 9/1960 | Bush | 222/205 |
| 3,104,032 | 9/1963 | Hansen | 222/205 |
| 4,880,409 | 11/1989 | Winblad et al. | D24/116 |
| 4,957,226 | 9/1990 | Pacia | 222/205 |
| 5,215,536 | 6/1993 | Lampropoulos et al. | 604/218 |

Primary Examiner—Diego F. F. Gutierrez
Attorney, Agent, or Firm—Helfgott & Karas

[57] ABSTRACT

A measuring spoon for accurately measuring and delivering a dose of medicine to a patient. The measuring spoon includes a hollow substantially circular filler tube which is open on both ends. At one end of the filler tube a spoon is connected so as to leave an opening for pouring medicine into the filler tube. A plunger is inserted in the opposite open end and acts as a base level for medicine poured into the filler tube. The filler tube includes indicator lines each indicating a different dosage amount. In use, the plunger top is aligned with the indicator line indicating the desired dosage. The filler tube is filled with the correct dosage and the plunger is depressed to fill the spoon.

15 Claims, 1 Drawing Sheet

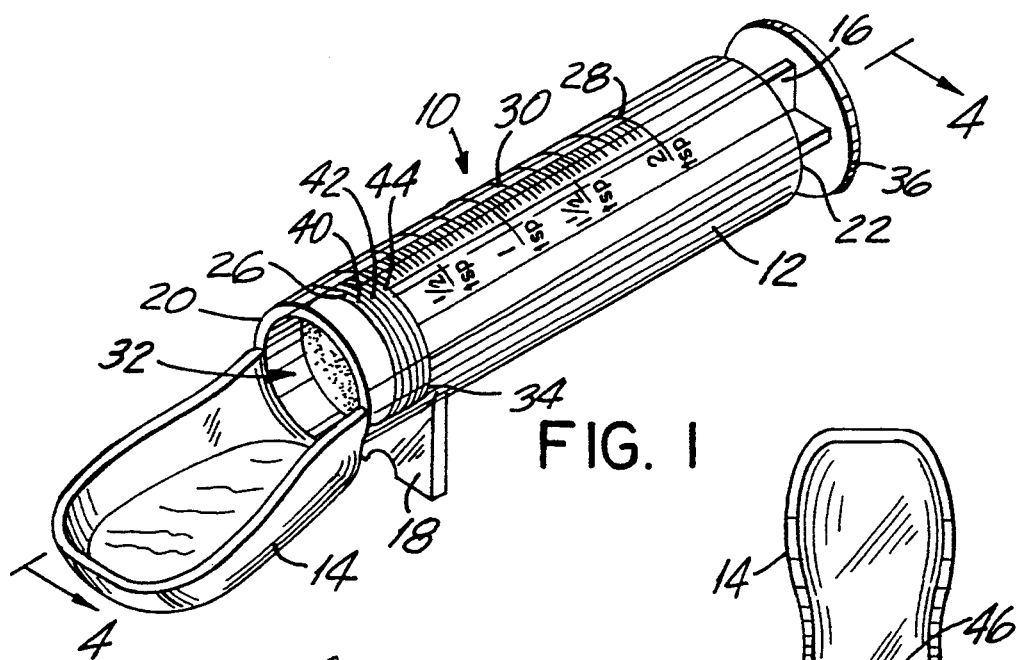
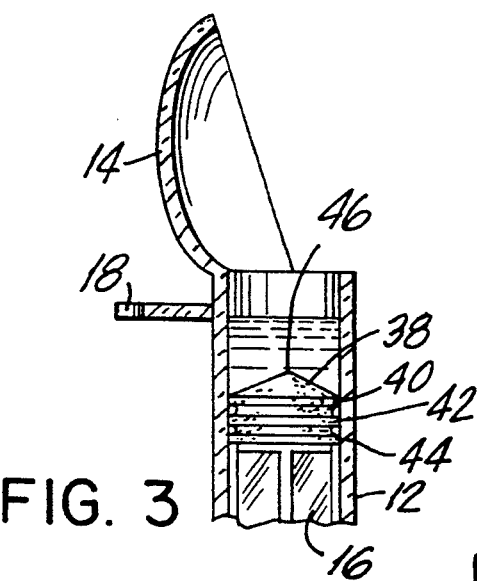
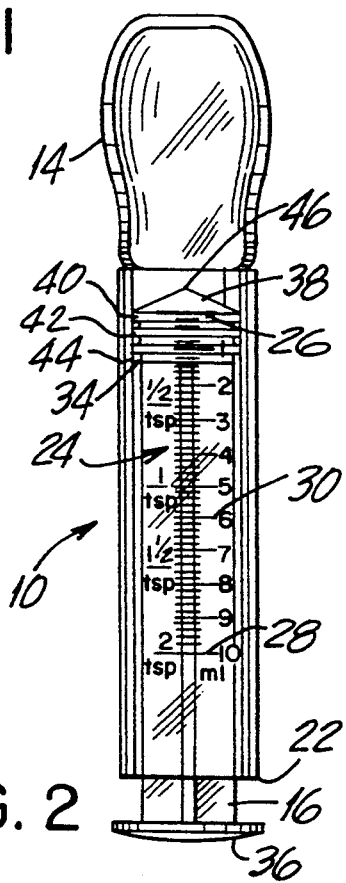
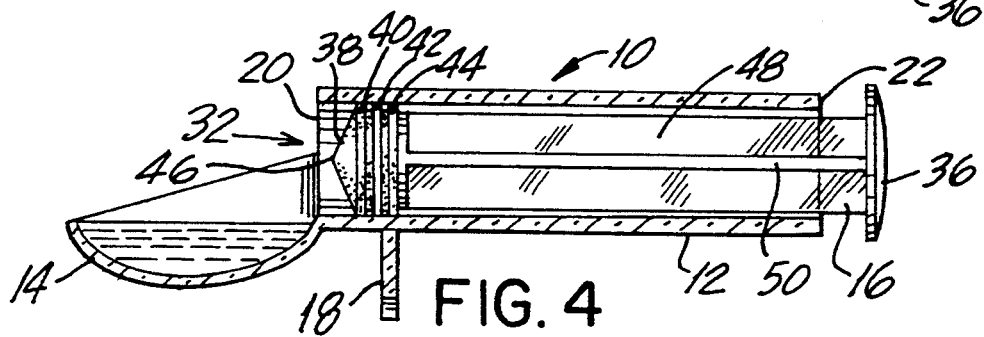

MEASURING SPOON

BACKGROUND OF THE INVENTION

1. Field of the Invention

This invention relates generally to measuring devices and, more particularly, to a device for providing a precise dosage of medicine.

2. Description of the Prior Art

For centuries people have been taking medication cure their ills. When this medication is in liquid form a person must ingest a particular dosage of the medicine. Most people just use an ordinary spoon. When using a spoon a person would normally pour the medicine into the spoon and ingest it. This method presents many problems. The major problems are the inaccurate dose of medication ingested, waste due to spillage, irregularities in the spoon size and inexact measurement of the medicine.

In an attempt to solve these problems, a device was developed resembling a closed ended test tube having a spoon connected at its open end. This device was designed to provide accurate doses of medication. It does not, however, provide any means for removing any of the medication which may adhere to the walls of the test nozzle and thereby also provides inaccurate dosages.

Another device designed to solve these problems resembles a syringe having markings indicating dosage amounts. This device includes a nozzle which is placed in a medicine bottle as the syringe draws the medication from the bottle. If an inaccurate amount is removed the nozzle is placed in the bottle again and the excess medicine is returned to the bottle. The nozzle is again removed and then placed in the mouth. The plunger is depressed and the medicine is squirted into a patient's mouth. There are many problems with such a device. Firstly, any excess medicine drawn into the nozzle comes in contact with both the tube and the air. This may contaminate the medication. If this medicine is returned to the bottle the entire bottle may become contaminated and if it is thrown out the medicine is wasted. This may end up being very expensive as the price of medicine is continually increasing. Secondly, the amount of medicine measured is not accurate since, when the plunger is depressed, some medicine will remain in the nozzle of the syringe. Furthermore, if the nozzle is not correctly positioned in the patient's mouth or the plunger is depressed too hard, injury or choking may result to the patient by providing a stream of medicine against a sensitive area of the mouth or directly into the throat.

It is, therefore, needed to produce a measuring spoon which solves the aforementioned problems and provides improvements over the presently known devices in order to precisely measure and supply exact dosages of medication.

SUMMARY OF THE INVENTION

An object of the present invention is to produce a measuring spoon which will provide a precise dosage of medication for ingestion by a patient.

Another object of the present invention is to produce a measuring spoon which substantially eliminates waste of medication.

A further object of the present invention is to produce a measuring spoon which is easy to use and safe.

A still further object of the present invention is to provide a measuring spoon from which an amount of medicine may be dispensed for ingestion in manageable amounts.

An even further object of the present invention is to produce a measuring spoon which can be filled and placed on a flat surface to retain the medicine prior to the time desired to ingest the medicine.

The measuring spoon of the present invention includes a filler tube. On the filler tube are individual markings indicating the amount of medicine which is placed into the filler tube. The markings terminate in a top fill line. The measuring spoon also includes a plunger, for entrance into a first opening of the filler tube. The plunger sets a bottom level to which the medicine can enter the filler tube. A spoon is connected at a second opening of the filler tube. The plunger is of a size which, when depressed, will extend completely through the filler tube and eject substantially all the medicine in the filler tube for deposit onto the spoon. The medicine can then be ingested by inserting the spoon into the patient's mouth. The measuring spoon also includes a stand, on which the measuring spoon can be supported when placed on a flat surface without spilling any medicine deposited therein. The stand is helpful if the medicine is placed in the filler tube and the patient is not ready to ingest the medicine or for any other reason there is a delay in time between measuring the dosage and ingesting of the medicine.

The aforementioned objects, features and advantages of the invention will, in part, become obvious from the following more detailed description of the invention, when taken in conjunction with the accompanying drawings, which form an integral part thereof.

BRIEF DESCRIPTION OF THE DRAWINGS

FIG. 1 is a perspective view of the measuring spoon of the present invention;

FIG. 2 is a front view of the measuring spoon of the present invention standing upright;

FIG. 3 is a cross-sectional side view of the dispensing end of the measuring spoon of the present invention standing upright and including a liquid substance therein; and FIG. 4 is a cross-sectional side view of FIG. 1 taken along the line 4—4 of FIG. 1.

DETAILED DESCRIPTION OF THE PREFERRED EMBODIMENT

The measuring spoon of the present invention will now be described with reference to FIGS. 1-4.

The measuring spoon is indicated generally by the number 10. It includes a filler tube 12, a spoon 14, a plunger 16 and a stand 18. The filler tube 12 is substantially cylindrical in shape having first and second opposing open ends 20, 22, respectively, and a hollow midsection. It is made from a clear see-through material so that the level of liquid within the filler tube 12 may be easily determined.

Extending along the length of the filler tube 12 is a level indicator 24. The level indicator 24 includes a top fill line 26, a bottom maximum indicator line 28 and intermediary indicator lines 30. The top fill line 26 is spaced a distance from the first end 20 and indicates the upper level to which a liquid substance should be filled. The spacing of the top fill line 26 from the first end 20 aids in preventing over filling of the filler tube 12 and spilling of the liquid from the filler tube 12 which could result from filling above the top fill line 26. The bottom indicator line 28 is spaced below the top fill line 26, and indicates the maximum amount of liquid substance which may be dispensed. Between the top and bottom lines 26, 28 are intermediary indicator lines 30. The level indicator 24 also includes labels at intermittent intervals indicating the measured amount of a liquid substance, usually a type of medicine, which is contained in the tube 12 between the particular indicator line and the top fill line 26. It should be appreciated that the top fill line will have a zero content indication and the measured amounts increase in a downward direction along the indicator 24.

Connected to the first end 20 of the filler tube 12 is a spoon 14. The spoon 14 consists of a shallow bowl which is connected to the filler tube 12 so as to provide an opening 32 at the end of the tube 12 for insertion and dispensing of a liquid substance through the first end 20 of the filler tube 12. The spoon 14 is arcuate in shape and has a diameter, at the connection point, substantially equal to the diameter of the first end 20. The depth of the bowl is such that at the connection with the filler tube 12, it angles downwardly away from the filler tube 12 at the first end 20 before angling back upwardly in the opposite direction to form a substantially rounded distal end. The shape is such as to easily and comfortably fit into a patient's mouth. The spoon 14 is also of a size large enough to receive at least the maximum amount of liquid which can fill the filler tube 12. Due to the shape of the bowl, when the measuring spoon 10 is positioned horizontally the bowl creates a pool for medicine within the filler tube 12 to fall in.

The measuring spoon 10 also includes a plunger 16. The plunger 16 has two ends, a dispensing end 34 and a handle end 36, and a midsection connecting the two ends. The midsection, as seen in FIGS. 1-4, is formed by a pair of orthogonal walls 48, 50. These walls have a width being slightly less than the inner diameter of the filler tube 12. The midsection is not limited to being formed by a pair of orthogonal walls but may be of any other functional form, extending between the dispensing end 34 and handle end 36. The dispensing end 34 is of a diameter equal to the inner diameter of the filler tube 12 and includes a substantially circular rubber tip 38. The rubber tip 38 includes a conically shaped point 46 and three rings 40, 42, 44. The three rings 40, 42, 44 are of a diameter equal to the inner diameter of the filler tube 12, creating a frictionally slideable relationship between the rubber tip 38 and the filler tube 12 when the plunger 16 is inserted into the filler tube 12. The first ring 40 defines the extent to which a liquid may reach into the filler tube 12.

The dispensing end 34 is inserted into the filler tube 12 and is used in conjunction with the level indicator 24 to aid in measuring a particular amount of substance. The first ring 40 is aligned with an indicator mark of the level indicator 24. Thus a desired dosage may easily be obtained by adjusting the first ring 40 in accordance with the indicator marks. The second and third rings 42, 44 respectively add a frictional force between the plunger 16 and the filler tube 12 to aid in preventing free sliding motion of the plunger 16 through the filler tube 12. The plunger 16 will thus remain stationary within the filler tube 12 when positioned for measurement of a liquid. This allows for a more precise measurement.

The handle end 36 extends outside the filler tube 12 and is of a size larger than that of the outer diameter of the filler tube 12. When the plunger 16 is inserted into the filler tube 12 it can only extend to a point at which the handle end 36 abuts with the second end 22 of the filler tube 12. The handle end 36 thus acts to limit the extent to which the plunger 16 may extend into the filler tube 12. It also aids the insertion of the plunger 16 into the filler tube 12. When positioned inside the filler tube 12 to the point at which the handle 36 meets the second end 22, the first ring 40 of the rubber tip 38 of the plunger 16 extends until the first end 20. The conical tip point extends past the first end 20 to a position above the spoon 14. This allows substantially all the substance within the filler tube 12 to be dispensed into the spoon 14 by the plunger 16 due to both the frictionally slideable relationship between the rubber tip 38 and the filler tube 12 and the extent to which the rubber tip 38 extends through the filler tube 12. The frictionally slideable relationship allows the rubber tip 38 to force into the spoon 16 the residue which adheres to the inside walls of the filler tube 12. The plunger 16 may also be completely removed from its position within the filler tube 12. This allows each component of the measuring spoon 10 to be easily cleaned. The inside of the filler tube 12 may thus be cleaned without interference from the plunger 16.

The measuring spoon 12 also includes a stand 18 as can be seen from FIG. 4. The stand 18 is attached to the filler tube 12 slightly spaced from the first end 20. It depends from the filler tube 12 on a side opposite the level indicator 24. The stand 18 acts to support and tilt the measuring spoon 10 when placed on a flat surface so that any substance within the filler tube 12 will not unwillingly be dispensed or spill outside the measuring spoon 10. It allows the liquid substance within the filler tube 12 to fall and come to rest within the bowl of the spoon 14.

In operation, the measuring spoon 10 is positioned vertically, as can be seen from FIGS. 2 and 3, so that the plunger 16 acts as a base for deposit of a liquid substance into the filler tube 12. The plunger 16 is adjusted within the filler tube 12 so that the top ring 40 of the rubber tip 38 is aligned inside the filler tube 12 with an indicator line on the level indicator 24 indicating the desired amount of substance to be dispensed. The liquid substance is then poured into the filler tube 12 through the opening 32 and atop the rubber tip 38 until the level of substance within the filler tube reaches the top fill line 26 as can be seen from FIG. 3. The rubber tip 38 thus acts as the deepest level the liquid substance may reach within the filler tube 12 and upon filling to the top fill line 26, the desired amount of liquid substance has been placed within the filler tube 12.

At this point, if it is not time to dispense the substance, the measuring spoon 10 can be placed on a flat surface without the possibility of the substance spilling as is shown in FIG. 4. When the measuring spoon 10 is tilted, the liquid in the filler tube 12 flows into the spoon 14 where it comes to rest while the measuring spoon 10 sits on the flat surface being supported at an angle by the stand.

When it is time to dispense the substance, the measuring spoon 10 is positioned horizontally. The plunger 16 is slowly depressed to extend further into the filler tube 12 and the liquid substance within the filler tube 12 is slowly dispensed into the spoon 14. The plunger 16 is depressed until the handle 36 mates with the second end 22 and the first ring 40 of the rubber tip 38 extends until the first end 20 thereby removing substantially all of the liquid substance within the filler tube 12 and placing it in the spoon 14. There is virtually no excess substance left in the filler tube 12 because of its frictionally slideable relationship with the rubber tip 38. The rubber tip 38 removes virtually all the residue which may cling to the inside of the filler tube 12. Thus an accurate dosage of liquid substance is inserted in the filler tube 12 and then dispensed into the spoon 14. At this point the spoon 14 is tilted towards the patient's mouth so that the patient may ingest the liquid and an accurate dosage is given to the patient.

This measuring spoon is designed mainly for providing an accurate dosage of medication to a patient but is not limited to such use. It may also be used to precisely measure ingredients used in cooking, scientific experimentation or any other instance in which precise measurements of substances are needed. Operation of the device is similar for all application.

There has been disclosed heretofore the best embodiment of the invention presently contemplated. However, it is to be understood that various changes and modifications may be made thereto without departing from the spirit and scope of the invention.

I claim:

1. A measuring spoon, comprising
   a hollow substantially cylindrical filler tube having a uniform diameter throughout, first and second equal open ends and having a level indicator thereon for use in measuring an amount of a liquid substance therein;
   a spoon extending from a first open end of the filler tube; and
   a plunger for insertion into the second open end and moveable through the tube the plunger including a substantially circular rubber tip and an enlarged handle on opposite ends thereof, the plunger being of a length such that, when fully inserted so the handle contacts the second open end, the rubber tip partially extends past the first open end to a position above the spoon whereby all of the liquid substance within the filler tube will be ejected into the spoon.

2. The measuring spoon as claimed in claim 1, wherein the rubber tip is of a diameter equal to an inner diameter of the filler tube creating a slideably frictional relationship with the filler tube when the plunger is inserted thereto.

3. The measuring spoon as claimed in claim 1, wherein the handle is of a size larger than an outside diameter of the filler tube creating an abutting relationship with the second open end of the tube when the plunger is fully inserted in the filler tube.

4. The measuring spoon as claimed in claim 1, wherein the level indicator includes marks indicating measured amounts of a liquid substance, wherein a first mark indicative of a fill level is slightly spaced from the first open end and a second mark indicative of a maximum level is slightly spaced from the second open end.

5. The measuring spoon as claimed in claim 4, wherein the level indicator further includes a plurality of intermediate marks located between the first and second marks, each intermediate mark indicating a different fill level.

6. The measuring spoon as claimed in claim 5, and comprising indicia along the indicator level, said indicia increasing numerically from said first to said second marks.

7. The measuring spoon as claimed in claim 1, further comprising a stand depending from the filler tube for supporting the measuring spoon at an angle when placed on a flat surface.

8. The measuring spoon as claimed in claim 1, wherein the rubber tip includes a plurality of rings.

9. The measuring spoon as claimed in claim 8, wherein the rubber tip includes a conical point above the last one of the plurality of rings.

10. The measuring spoon as claimed in claim 1, wherein the spoon is of a size large enough to receive an amount of liquid at least equal to a maximum amount of liquid which will fill the tube.

11. The measuring spoon as claimed in claim 1, wherein the plunger and tube are in a separable relationship with each other for ease in cleaning the measuring spoon.

12. The measuring spoon as claimed in claim 1, wherein the tube is made of clear see-through material for observing the level of liquid within the tube.

13. The measuring spoon as claimed in claim 1, wherein the spoon is shaped to fit comfortably into a patient's mouth.

14. The measuring spoon as claimed in claim 1, wherein the plunger includes a midsection between the rubber tip and enlarged handle and formed of first and second orthogonal walls.

15. The measuring spoon as claimed in claim 1 wherein the level indicator includes means for limiting the maximum fill level of the tube to a position displaced from the first open end wherein, when the liquid substance is inserted into the tube to a level indicated by the means for limiting, spilling of the liquid substance from the tube is minimized and the removal of all the liquid substance from the tube into the spoon by the plunger is maximized.

* * * * *